United States Patent
Thyni et al.

(10) Patent No.: US 9,693,185 B2
(45) Date of Patent: Jun. 27, 2017

(54) METHOD AND ARRANGEMENT FOR RETRIEVING GEOGRAPHIC LOCATION

(71) Applicant: Telefonaktiebolaget L M Ericsson (publ), Stockholm (SE)

(72) Inventors: Tomas Thyni, Jarfalla (SE); Mats Forsman, Ronninge (SE); Annikki Welin, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 184 days.

(21) Appl. No.: 14/413,533

(22) PCT Filed: Nov. 20, 2014

(86) PCT No.: PCT/SE2014/051393
§ 371 (c)(1),
(2) Date: Jan. 8, 2015

(87) PCT Pub. No.: WO2016/080880
PCT Pub. Date: May 26, 2016

(65) Prior Publication Data
US 2016/0330576 A1 Nov. 10, 2016

(51) Int. Cl.
*H04W 24/00* (2009.01)
*H04W 4/02* (2009.01)
(Continued)

(52) U.S. Cl.
CPC ............ *H04W 4/02* (2013.01); *H04L 61/1511* (2013.01); *H04W 4/20* (2013.01); *H04W 4/22* (2013.01)

(58) Field of Classification Search
CPC H04W 4/02; H04W 4/20; H04W 4/22; H04L 61/1511
See application file for complete search history.

(56) References Cited

U.S. PATENT DOCUMENTS 8,281,377 B1* 10/2012 Snow ............... H04N 21/41407
726/11
2008/0155094 A1 6/2008 Roese et al.
(Continued)

FOREIGN PATENT DOCUMENTS

TW 201127098 A1 8/2011
WO 0213459 A2 2/2002

OTHER PUBLICATIONS

International Search Report and Written Opinion, Application No. PCT/SE2014/051393, dated Jul. 1, 2015, 9 pages.
(Continued)

*Primary Examiner* — Barry Taylor
(74) *Attorney, Agent, or Firm* — NDWE LLP

(57) ABSTRACT

Method and Over The TOP (OTT) service providing node for retrieval of geographic location information of a communication device communicatively coupled to the OTT service providing node. A request for an OTT service is received from the communication device, and an identifier of the communication device is determined. An operator of the communication device is determined, by utilizing the determined identifier of the communication device. An identifier of an Operator Location Service (OLS) node of the operator is determined. A location request is sent to the OLS node for requesting geographic location information of the communication device, the location request comprising the identifier of the communication device, the identifier of the communication device to be utilized by the OLS node for retrieving the requested geographic location information from a location server, and the retrieved geographic location information to be sent by the OLS node to the OTT service providing node.

20 Claims, 9 Drawing Sheets

(51) Int. Cl.
*H04W 4/20* (2009.01)
*H04L 29/12* (2006.01)
*H04W 4/22* (2009.01)

(56) References Cited

U.S. PATENT DOCUMENTS

| | | | | |
|---|---|---|---|---|
| 2009/0248822 | A1* | 10/2009 | De Vriendt | H04L 63/0414 709/206 |
| 2011/0145103 | A1 | 6/2011 | Ljunggren et al. | |
| 2011/0158224 | A1* | 6/2011 | Kawauchi | H04L 29/12367 370/352 |
| 2011/0165892 | A1 | 7/2011 | Ristich et al. | |
| 2014/0016635 | A1* | 1/2014 | Kano | H04L 45/72 370/389 |
| 2016/0080313 | A1* | 3/2016 | Hirschman | H04L 61/2007 370/329 |

OTHER PUBLICATIONS

"Protocol specifications for emergency service caller location determination and transport," Sep. 2014, 28 pages, Draft DES/NTECH-00025, V0.0.5, ETSI Standard, European Telecommunications Standards Institute.
"Functional architecture to support European requirements on emergency caller location determination and transport," Oct. 2014, 46 pages, Draft ETSI ES 203 178 V1.0.2, ETSI Standard, European Telecommunications Standards Institute.
"NENA Recommended Method(s) for Location Determination to Support IP-Based Emergency Services, Technical Information Document (TID)," Dec. 21, 2006, 42 pages, NENA 08-505, Issue 1, NENA VoIP Location Working Group.
"NENA Technical Requirements Document for Location Information to Support IP-Based Emergency Services," Dec. 21, 2006, 34 pages, NENA 08-752, Issue 1, NENA VoIP Location Working Group.
"Telecommunication management; Charging management; Location Services (LCS) charging", *3GPP TS 32.271; 3rd Generation Partnership Project; Technical Specification Group Service and System Aspects; (Release 9)*, http://www.3gpp.org/DynaReport/32271.htm, (Dec. 2009), 26 pages.
"Telecommunications and Internet converged Services and Protocols for Advanced Networking (TISPAN); NGN Functional Architecture; Network Attachment Sub-System (NASS)", *ETSI ES 282 004 V3.4.1*, (Mar. 2010) 51 pages.
Boucadair, et al., "Host Identification: Use Cases, draft-boucadair-intarea-host-identifier-scenarios-03", *INTAREA Working Group Internet—Draft*, (Mar. 14, 2013), 17 pages.
Patrick, M., et al., "DHCP Relay Agent Information Option", *Network Working Group, RFC 3046, Category: Standards Track*, (Jan. 2001), 14 pages.
Written Opinion of the International Searching Authority, Application No. PCT/SE2014/051393, dated Jun. 30, 2015, 5 pages.
First Office Action, Taiwan Application No. 104138286, dated Dec. 8, 2016, 11 pages.
"Functional architecture to support European requirements on emergency caller location determination and transport," Apr. 2014, 42 pages, Final draft ETSI ES 203 178 V1.0.0, ETSI Standard, European Telecommunications Standards Institute.

* cited by examiner

Fig. 1 (existing art)

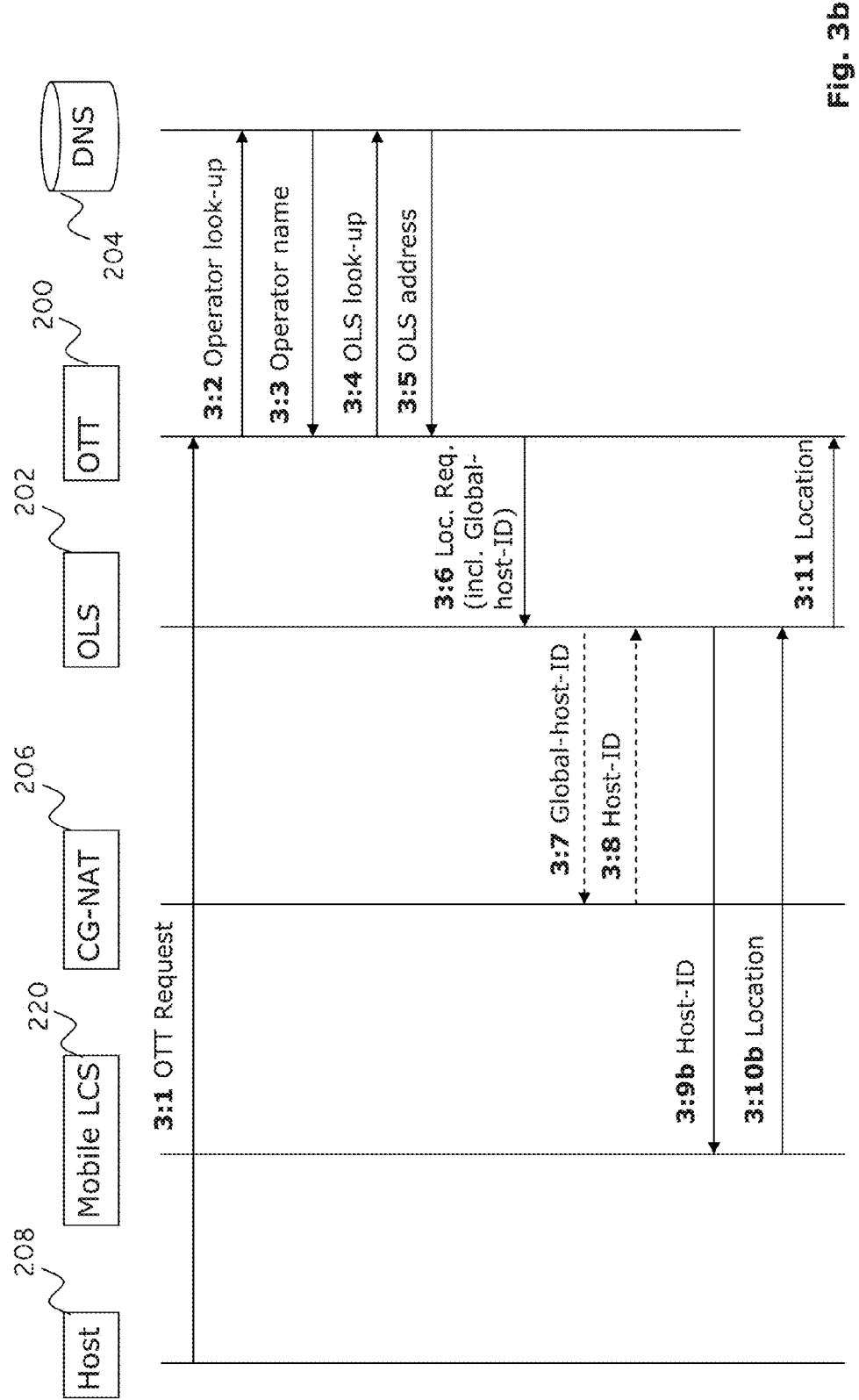

METHOD AND ARRANGEMENT FOR RETRIEVING GEOGRAPHIC LOCATION

CROSS-REFERENCE TO RELATED APPLICATIONS

This application is a National stage of International Application No. PCT/SE2014/051393, filed Nov. 20, 2014, which is hereby incorporated by reference.

TECHNICAL FIELD

The present disclosure relates to positioning, especially it relates to methods and arrangements for location retrieval when applying OTT (Over The Top) services.

BACKGROUND

So called OTT services have been developed to enable end users to perform various services more flexible. For instance, services like Skype and Viber offer telephony through the Internet.

The end users typically use their wired or wireless communication devices to communicate, and are communicatively connected via a communication network to an OTT service providing node of an OTT service provider. Typically, communication networks consist of a plurality of operator controlled networks of different operators. The geographic location of the communication devices of the end users are generally not known by the OTT service provider.

Normally, the OTT services providing nodes do not even need to be aware of geographic location of end users in order to provide OTT services properly. However, in some situations, such as in case of emergency, it may be of importance that a called party will be aware of the calling party's geographic location quickly and appropriately.

Within this description the term "host" will be used to denote any appropriate communication device which is fixed network connected or connected via mobile communication network. End-users will utilise hosts to perform OTT services over communication networks. For instance, a host may be implemented as a mobile phone, a fixed telephone, a computer, a tablet, a personal digital assistant, etc.

Furthermore, the term "operator" will be used to denote a network service provider of the communication network, and not the OTT service provider.

Geographic location information may be provided as GPS (Global Positioning System) coordinates, a street address, a post code, etc.

With reference to FIG. 1, an example of a situation where a host is connected via a communication network to an OTT service will now be described.

The host 108 of this example is a computer which is fixed connected to the operator network. The host 108 has an installed application or software by which an end-user is enabled to perform IP (Internet Protocol) telephony. An OTT service providing node 100 is arranged to offer the service IP telephony to the end-user and is connected to the operator network via a NAT (Network Address Translation) node 106. The OTT service providing node 100 is not aware of the IP-addresses of each individual host 108, instead the OTT service providing node 100 uses the IP-address of the NAT 106, which handles communication of user data, such that the user data is communicated with the appropriate hosts 108. The OTT service pro viding node 100 does not have knowledge of the IP-addresses of each individual host 108. Instead, the OTT service providing node 100 only has an IP address of the NAT node 106 and a layer 4 protocol and port number on the NAT node 106, which in combination is a representation of the host during an active session. Thus, the NAT node 106 is arranged to convey user data between the OTT service providing node 100 and hosts 108. When addressing a host 108, the OTT service providing node 100 uses a public ID of the host, e.g. an IP-address of the NAT node 106 and an appropriate layer 4 protocol and port number. The NAT node 106 translates the public ID into a private ID of the host 108. However, the OTT service providing node 100 will not get awareness of the geographic location of the host.

Even if the above described example discloses a situation where the host 108 is connected via a NAT node 106, the corresponding problem arises also in communication networks which do not have NAT nodes arranged, i.e. in communication networks where an OTT service providing node is aware of IP-addresses of individual hosts 108. In both cases, the OTT service providing node 108 is not aware of the geographic location information of hosts 108 which it provides OTT services to.

However, there are situations where an end-user wants to give information of his/her geographic location, for instance a delivery address or GPS (Global Positioning System) coordinates. End-users are not always aware of their appropriate geographic location, for instance when you are visiting an unknown area and are lost, and especially children or elderly. In addition, in emergency situations the end-user may also be stressed and confused which makes it hard to appropriately give correct information of his/her geographic location. Even if the OTT service providing node 100 is capable to communicate with the host 108, there is a problem that the OTT service providing node 100 will not be aware of the geographic location information of the hosts 108.

Thus there is a need for a more appropriate solution for retrieving geographic location information.

SUMMARY

It would be desirable to obtain improved performance for OTT (Over The Top) services in communication networks. It is an object of this disclosure to address at least any of the issues outlined above.

Further, it is an object to provide OTT service providing nodes with functionality of retrieving geographic location information of hosts communicatively connected to communication networks and performing OTT services. These objects may be met by a method and an arrangement according to the attached independent claims.

According to one aspect, a method is provided which is performed by an OTT (Over The Top) service pro viding node for retrieval of geographic location information of a communication device. The communication device is communicatively connected to the OTT service providing node via a communication network. The method comprises receiving a request for an OTT service from the communication device, and determining an identifier of the communication device. The method comprises further determining an operator of the communication device, by utilising the determined identifier of the communication device; and determining an identifier of an OLS (Operator Location Service) node of the operator. The method comprises also sending a location request to the OLS node for requesting geographic location information of the communication device, the location request comprising the identifier of the communication de vice, the identifier of the communication device to be utilised by the OLS node for retrieving the requested geographic location information from a location server, and the retrieved geographic location information to be sent by the OLS node to the OTT service providing node; and receiving the sent geographic location information.

Furthermore, the identifier of the communication device may comprise both an IP (Internet Protocol) address of the NAT node and a port number of the NAT node, the communication device being communicatively connected to the NAT node. The operator may be determined by sending the determined identifier of the communication device to a DNS (Domain Name Server) and receiving the operator's domain name in response thereto. The identifier of the OLS node may be determined by sending a request for the operator's OLS node, to the DNS and receiving the identifier of the OLS node in response thereto. The identifier of the OLS node may be stored as an SRV-record (Service-record) in the DNS.

According to a further aspect, an OTT service providing node, which is adapted to perform the method steps of any of the above described methods, is also provided. The OTT service providing node comprises a controller and a communication module arranged therefore.

According to another aspect a method is provided which is performed by an OLS (Operator Location Server) node for enabling an OTT (Over The Top) service providing node to retrieve geographic location information of a communication device. The communication device is communicatively connected to the OTT service providing node via a communication network. The method comprises receiving a location request from the OTT service providing node for requesting geographic location information of the communication device, the location request comprising an identifier of the communication device. The method comprises further retrieving the geographic location information of the communication device from a location server by utilising the retrieved identifier of the communication device, and sending the retrieved geographic location information of the communication device to the OTT service pro viding node, to be received by the OTT service providing node.

Furthermore, the identifier of the communication device may be received formatted as a Global-host-ID comprising an IP-address of the communication device. The identifier of the communication device may alternatively be received formatted as a Global-host-ID, wherein the method further may comprise determining that the communication device is communicatively connected to the OTT service node via a NAT (Network Address Translation) node of the communication network by utilising the received Global-host-ID of the communication device, and retrieving a Host-ID of the communication device from the NAT node by utilising the received Global-host-ID.

Furthermore, the method may comprise determining which NAT node the communication device is connected via by utilising the received Global-host-ID, wherein retrieving the Host-ID may comprise sending the received Global-host-ID to the determined NAT node and receiving the Host-ID in response thereto.

Retrieving the location information of the communication device may comprise sending the Host-ID of the communication device to a location server and receiving the location information of the communication device in response thereto.

According to a further aspect, an OLS node, which is adapted to perform the method steps of any of the above described methods, is also provided. The OLS node comprises a controller and a communication module arranged therefore.

By arranging OLS nodes and storing appropriate identifiers of the OLS nodes in DNSs, e.g. as SRV-records, an OTT service providing node may retrieve accurate geographic location information of host from appropriate location servers. The retrieval may be performed automatically and without need for human intervention. Furthermore, the OTT may apply the method for both fixed connected hosts and mobile hosts.

BRIEF DESCRIPTION OF DRAWINGS

The solution will now be described in more detail by means of exemplary embodiments and with reference to the accompanying drawings, in which:

FIGS. 3a-b are schematic signalling diagrams of methods, according to possible embodiments.

DETAILED DESCRIPTION

There is a need for a solution which enables an OTT service providing node to retrieve accurate information of the geographic location of hosts by which end-users are performing OTT services.

By implementing a look-up capability for OTT service providing nodes to identify an operator for a host, and an Operator Location Service (OLS) node which the is capable to obtain the geographic location information of the host from a Location Server (LCS), an OTT service providing node will be enabled to fast retrieve the appropriate geographic location of the host by requesting the Operator Location Service node. For instance, when an end-user utilises an OTT service to perform an emergency call, the OTT service providing node will retrieve the geographic location information of the host from the OLS node within sub-seconds and present to an emergency operator.

Figure 1:
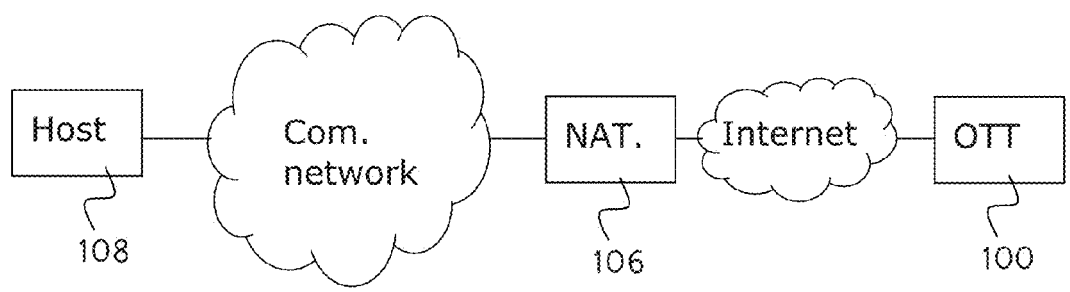
FIG. 1 is a schematic illustration of an arrangement in accordance with the existing art.
Figure 2:
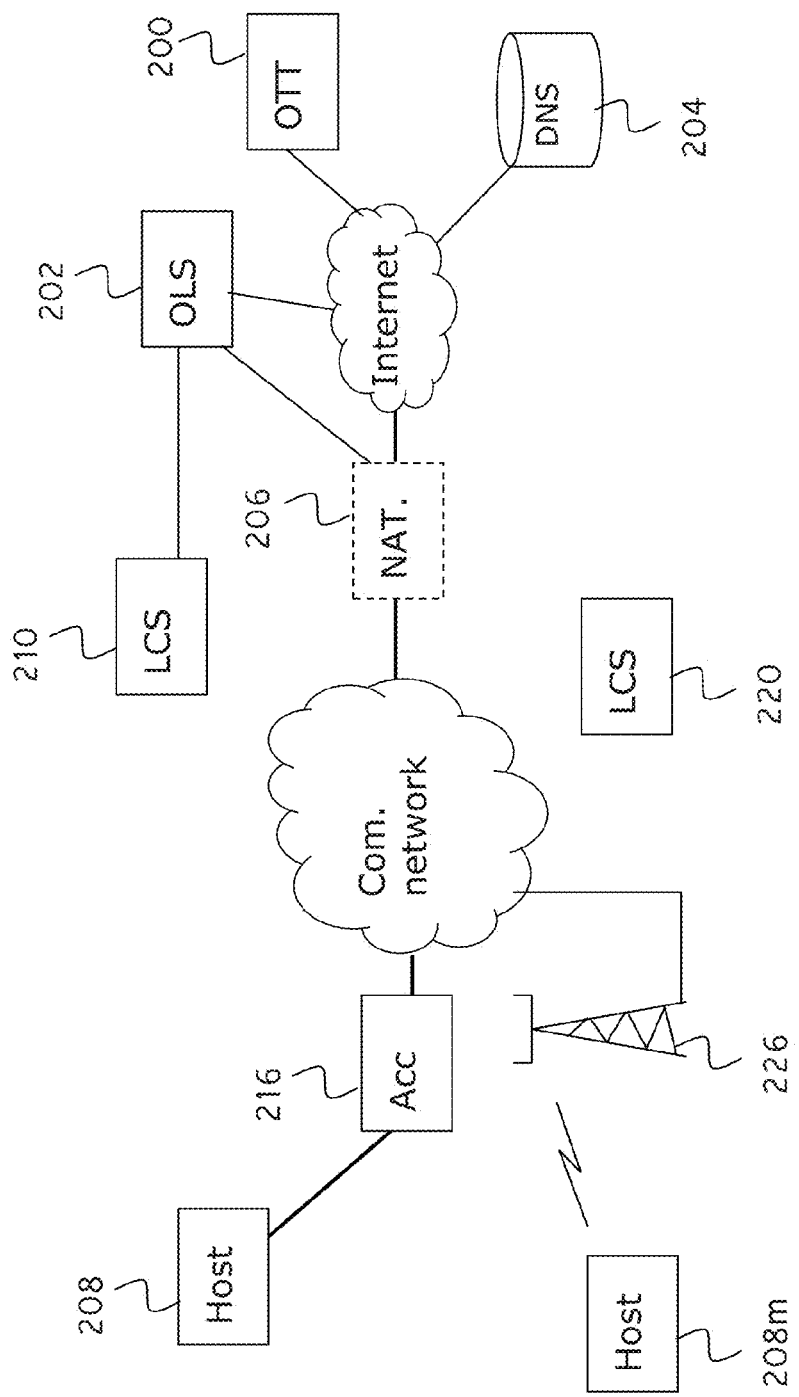
FIG. 2 is a schematic illustration of an arrangement, according to a possible embodiment.

With reference to FIG. 2, which is a block scheme, a scenario in a communication network will now be described in accordance with one exemplifying embodiment.

A host 208 is connected to an OTT (Over The Top) service providing node 200 via a communication network for performing an OTT service, such as making a Skype call, etc. In this exemplifying embodiment, the host 208 is fixed connected to the communication network of an operator via an access node 216. The OTT service providing node 200 is communicatively connected to the communication network via internet. Optionally, an operator of the communication network may arrange a CG-NAT (Carrier Grade Network Address Translation) node 206 between individual hosts and the OTT service providing node 200, which will be described below in a related exemplifying embodiment.

Conventionally, the OTT service providing node 200 is not aware of the geographic location of the hosts 208. The OTT service providing node 200 uses the IP (Internet Protocol)-address of the hosts 208 to address the appropriate host 208. However, in some situations there is a need to retrieve an appropriate geographic location of a host 208. For instance, when performing an emergency call the OTT service providing node 200 wants to retrieve a geographic location of the host 208, such as a street address or GPS (Global Positioning System) coordinates to provide to e.g. an ambulance or fire department.

In this embodiment, an OLS (Operator Location Service) node 202 is arranged in the communication network. Today, when connecting a host 208 to a communication network, the geographic location of the host 208 is uploaded to an LCS (Location Server) 210 of the communication network operator. However, as said, the OTT service pro viding node 200 is not aware of the geographic locations of the hosts 208 and is also not aware of the IP-address of the LCS 210.

When receiving a request for an OTT service the OTT service providing node 200 determines an identifier of the host, e.g. a communication device from which the request is received. In this embodiment, this is performed by identifying a Global-host-ID of the host 208 such as an IP-address of the host 208 and a L4 port number of the ongoing session, and performing a DNS look-up for the IP-address of the host 208. The DNS look-up is performed by sending the IP-address of the host 208 to a DNS (Domain Name Server) 204 and receiving an operator name in response thereto, i.e. the name of the host's operator. The identified Global-host-ID, i.e. the IP-address of the host 208 together with the layer 4 protocol and port number of the on going session could be seen as an identifier of the host 208. Then the OTT service providing node 200 looks up the IP-address of the OLS node 202 of the operator, by sending a DNS request for the OLS node 202 to the DNS server 204 and receiving an identifier of the OLS node 202 in response. The received identifier may be implemented as an IP-address of the OLS node 202.

The OTT service providing node 200 sends then a location request for the geographic location of the host 208 to the OLS node 202. This location request comprises the Global-host-ID. Optionally, the OTT service providing node 200 may in addition provide the request to the OLS node 202 with an indication that the request relates to a location service, e.g. by including a port number for location service.

The received Global-host-ID is then utilised by the OLS node 202 for retrieving the geographic location of the host 208 from the LCS 210 where it is stored.

Today, when connecting a host fixed to a communication network, the geographic location of the host is uploaded to the LCS 210, for instance in accordance with a DHCP (Dynamic Host Configuration Protocol) Line ID option.

Finally, the retrieved geographic location is sent to the OTT service providing node 200. The above described procedure enables the OTT service providing node 200 to retrieve the appropriate geographic location of the host 208. Typically, in emergency situations a calling party of a host 208 may be stressed and confused and have problems to appropriately give information of his/her geographic location. With the described solution the OTT service providing node 200 may determine this information fast and appropriately within milliseconds, such that a phone operator at an emergency call authority will get the information presented when receiving the emergency call.

Thus, by arranging an OLS node 202 in the communication network and storing the IP-address of the OLS node 202 in a suitable DNS server 204, OTT service providing nodes 200 will be enabled to retrieve appropriate geographic locations of hosts 208 from the OLS node 202. In addition, by storing the IP-address of the OLS node 200 as an SRV-record in the DNS 204, also an appropriate tcp/udp port number may be stored together with the IP-address of the OLS node 202.

In one related exemplifying embodiment which is related to the one described above, the operator has arranged a NAT node 206, e.g. a CG NAT node between the OTT service providing node 200 and the host 208. The operator has assigned IP-addresses as Host-IDs of the hosts 208. For instance, the operator may have assigned private IP-addresses or a block of public IP-addresses which the NAT node 206 assigns to the respective hosts. This related embodiment differs further in that the OLS node 202 retrieves the Host-ID from the NAT node 206 by sending the identified Global-host-ID to the NAT node 206 and receiving the Host-ID in response thereto. In other words, the identified IP-address of the NAT node 206 and the L4 protocol port of the ongoing session is sent to the NAT node 206, which returns the host's IP-address. The host's IP-address is then sent as Host-ID to the LCS 210 as correspondingly to in one above described embodiment.

It is to be noted that in the embodiments above is two different kinds of port numbers used, an optional port number to identify that the OTT service providing node requests a location service, and the L4 protocol and port number which is applied to specify an ongoing session.

It is also to be noted that the term "fixed connected" is not limited to physical cable connections only, and that also WLAN (Wireless Local Area Network) connections, such as a Wi-Fi (Wireless Fidelity), may be applied instead when appropriate, within the disclosed concept.

In another alternative embodiment, which is based on some above described embodiments, a corresponding solution is applied on another host 208m, which is connected to the communication network via a RAN (Radio Access Network). The RAN is illustrated as a radio base station of a suitable radio access technology, e.g. as a NodeB of a UMTS (Universal Mobile Telecommunications System) network, or as an eNodeB of an LTE (Long Term Evolution) network. In this embodiment, there is a specific node, e.g. an Serving mobile location center (SMLC) (not shown) arranged to obtain radio interface measurements from the location measurement units (LMUs) for the mobile terminal and store and update the geographic location of hosts 208m in a location server of the communication network when connecting the hosts 208m.

Thus, by implementing the OLS nodes 202 and storing access information of the OLS nodes 202 in DNSs 204, OTT service providing nodes 202 will be enabled to retrieve geographic location information of hosts 208, 208m, both when the hosts 208 are fixed connected and when the hosts 208m are connected via RANs.

Figure 3A:
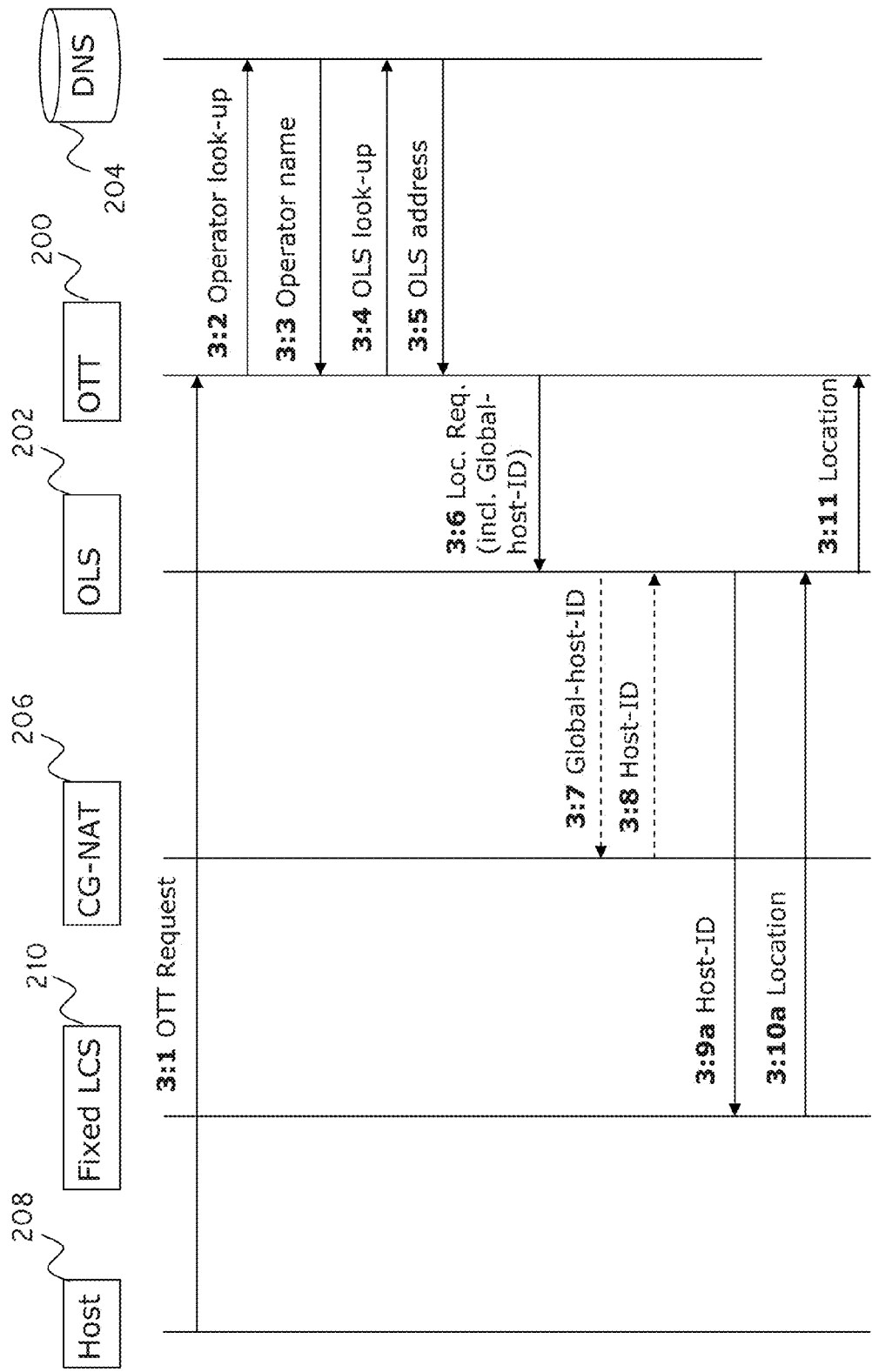

With reference to the FIGS. 3a and 3b, which are schematic flow charts, the above described scenario will now be further described, in accordance with related exemplifying embodiments.

The FIG. 3a describes a scenario when a host 208 is fixed connected to the communication network, and FIG. 3b describes a scenario when another host 208m is connected to the communication network via a RAN (Radio Access Network). First the scenario of the fixed connected host 208 will be described.

As mentioned above in conjunction with another embodiment, the geographic location of the host 208 has been pre-set into the fixed LCS 210 when connecting the host 208 to the communication network.

In a first action 3:1, the host 208 sends an OTT request to the OTT service providing node 200. As said above, the OTT request comprises a Global-host-ID which is an identifier of the host 208. The Global-host-ID may comprise an IP-address of the host 208 or the IP-address of the CG-NAT node 206 together with the layer 4 protocol and port number for the ongoing session. When receiving the OTT request, the OTT service providing node 200 determines the Global-host-ID and performs a reverse DNS look-up of the IP-address Global-host-ID to determine which operator the host 208 or the CG-NAT node 206 is operated by. This is performed by in a following action 3:2 sending the determined IP-address to the DNS server 204 and, in another action 3:3, receiving information of the present operator from the DNS server 204. It is to be noted that the proposed solution is not limited to perform the reverse DNS look-up and that the information regarding the present operator may be retrieved alternatively within the disclosed concept. For instance, the information regarding the present operator may alternatively be determined from the Regional Internet Registry (RIR).

When having received the information regarding the present operator, the OTT service providing node 200 queries the DNS server 204 for the IP-address of an OLS (Operator Location Service) node 202 of the present operator. This is performed by, in an action 3:4, performing a DNS lookup for an SRV (service) record of the operator, and receiving the IP-address and service port number of the operator's OLS in response in following action 3:5.

In another action 3:6, the OTT service providing node 200 sends a location request to the OLS node 202, wherein the location request comprises the Global-host-ID of the host 208, i.e. the IP-address of the CG-NAT and the layer 4 protocol and port number of the CG-NAT 206 to which the host 208 is connected.

When having received the Global-host-ID, in a following action 3:9a, the OLS node 202 determines the Host-ID (i.e. the host's IP-address) from the received Global-host-ID and sends the Host-ID to the LCS 210 which has stored geographic location information of fixed connected hosts 208. The LCS 210 then sends stored location information regarding the host 208 to the OLS node 202 in response, in another action 3:10a.

In a final action 3:11, the OLS node 202 sends the received location information to the OTT service providing node 200 to be applied.

In a related exemplifying embodiment which is based on the above described one, the operator has arranged a NAT node 206. This embodiment differs further in that the received Global-host-ID comprises the IP-address of the NAT node 206 and a layer 4 protocol and port number of the ongoing session instead of the IP-address of the host.

Furthermore, this embodiment comprises the two additional actions: 3:7 and 3:8 (dotted). In action 3:7, the OLS node 202 sends the Global-host-ID to the NAT node 206. The NAT node 206 maps the Global-host-ID to the Host-ID which it returns in response thereto, in a following action 3:8. In addition, in action 3:9a the OLS node 202 does not determine the Host-ID from the Global-host-ID, instead the OLS node sends the received Host-ID.

As describe above in conjunction with another embodiment, the disclosed concept is not limited to retrieval of location information of fixed connected hosts 208. The concept may also be applied for communication networks to which hosts 208*m* are connected via RANs, (so called mobile hosts), or via satellites, and communication networks with any suitable combination of fixed connected host 208, satellite connected hosts, and mobile hosts 208*m*.

In a related exemplifying embodiment which refers to FIG. 3*b*, the corresponding scenario for retrieving location information of a mobile host 208*m* will now be described.

The arrangement of FIG. 3*b* differs from the arrangement of FIG. 3*a* in that the host is a mobile host 208*m*, and in that another LCS 220 is arranged to handle location of mobile hosts 208*m*.

The actions 3:1-3:8, and 3:11 are similar in both the embodiments and will therefore not be further discussed here. However, the action 3:9b differs from the action 3:9a above in that the OLS node 202 has been informed which Global-host-IDs that belong to fixed connected hosts 208 and which Global-host-IDs IP-addresses that belong to mobile hosts 208*m*, and sends therefore the Global-host-ID to the LCS 220 which is arranged to handle location of mobile hosts 208*m* instead of the LCS 210 which is arrange to handle location information of fixed connected hosts 208.

Correspondingly, the action 3:10b differs from the action 3:10a in that the sent location information relates to location of the mobile host 208*m* and is sent from the LCS 220 which is arranged to handle location information of mobile hosts 208*m*.

However, in an alternative exemplifying embodiment which is related to the embodiment described above, the OLS node 202 has not been informed regarding which Global-host-IDs which belong to the different types of hosts, and the OLS node 202 sends instead the Global-host-IDs to both the LCSs 210, 220. The appropriate one of the LCSs 210, 220 sends then the requested location information, while the other one of the LCSs 210, 220 does not respond to the request.

Figure 4:
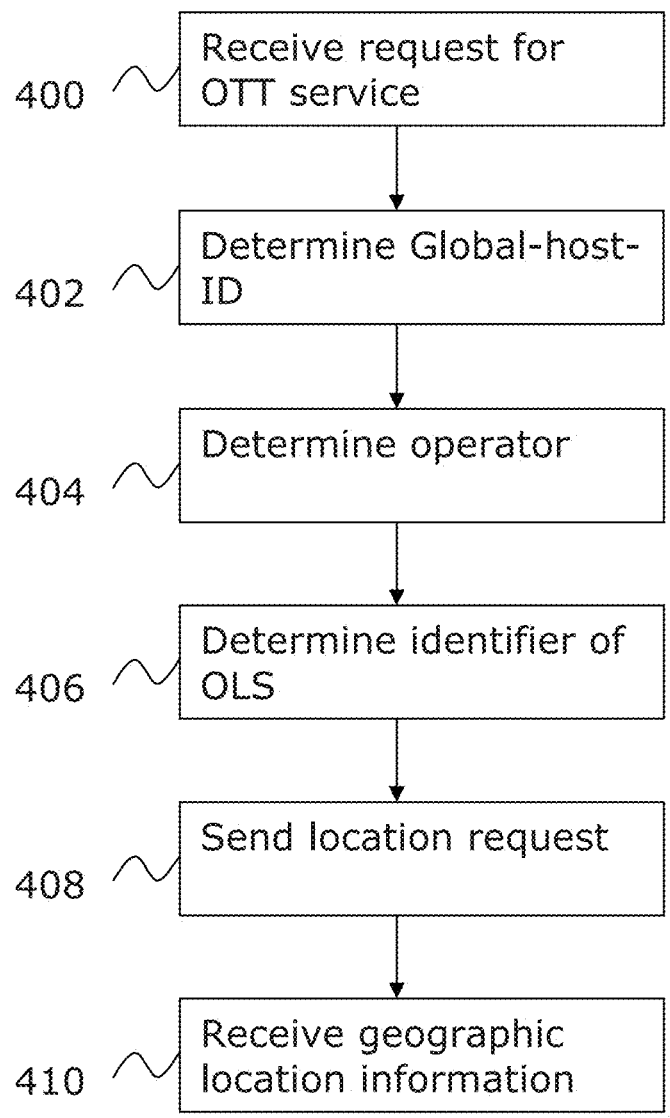
FIG. 4 is a schematic flow chart of a method, according to possible embodiments.

With reference to FIG. 4, which is a schematic flow chart, a method performed by an OTT service providing node will now be described in accordance with one exemplifying embodiment. The method which will be described is performed by an OTT service providing node according to some of the above described embodiments, without limitation. However, the method may in addition also be performed by other suitable OTT service providing nodes within the disclosed concept.

In a first action 400, the OTT service providing node receives a request for an OTT service from a host which is communicatively connected to a communication network of an operator. The request comprises a Global-host-ID of the host, which in this embodiment is realised as the IP-address of the host and a layer 4 protocol and port number of the ongoing session. This Global-host-ID is determined from the received request, in a following action 402.

The OTT service providing node is now aware of the Global-host-ID, but has no information regarding present geographic location information of the host, i.e. where the host is currently located.

In another action 404, the OTT service providing node determines which operator the host is connected to in the ongoing session. In this exemplifying embodiment, this is performed by performing a reverse DNS look-up of the IP-address of the host to a DNS server, i.e. by sending the IP-address of the host to the DNS server and receiving a domain name of the operator in response thereto.

An OLS (Operator Location Server) node is arranged to enable the OTT service providing node to retrieve the geographic location information of the host. In a following action 406, the OTT service providing node determines an identifier of the OLS node, such that the OTT service providing node can query the OLS node for geographic location information of the host. For instance the identifier of the OLS node may be implemented as an IP-address, e.g. in according to IPv4 or IPv6. The OTT service providing node determines the identifier of the OLS node by sending a DNS request for an SRV-record (Service-record) of the operator to the DNS, where it has been stored, and receives the identifier of the OLS node in response thereto. It is to be noted that even if the request in this exemplifying embodiment is for an SRV-record, it is not limited thereto. The identifier of the OLS node may be alternatively stored in the DNS, e.g. as an A-record or an AAAA-record, and the request may be related also to other suitable records within the disclosed concept.

Optionally, the OTT service providing node 200 may in addition to the identifier of the OLS node 202 provide an appropriate port number of the requested service. For instance, if a port number representing location service is provided, the node 202 may be arranged to respond to location request but not to requests for other service types.

Now the OTT service providing node is aware of how to address the OLS node, and sends a request for geographic location information of the host to the OLS, in a following action 408. The OLS node may retrieve the location information of the host according to a method which will be further described below in conjunction with another embodiment. When the OLS node has retrieved the location information of the host, it sends the location information to the OTT service providing node, such that the OTT service providing node will receive this geographic location information in a final action 410.

Thereby, the OTT service providing node will be enabled to make use of the geographic location information of the host. For instance, if the OTT service is an emergency call, the OTT service providing node will automatically retrieve appropriate location information of the host and present to an emergency authority operator substantially simultaneously as he/she answers the emergency call.

In a related exemplifying embodiment, which is similar to the above one described, the OTT service providing node is instead communicatively connected to an operator network via a CG-NAT (Carrier Grade Network Address Translation) node. From the OTT service providing node's view, the host is addressed by the IP-address of the CG-NAT node and a layer 4 protocol and port number of the CG-NAT node which relates to an ongoing session of the host. As stated above, the combination of the CG-NAT node's IP-address and the layer 4 protocol and port number could be referred to as a Global-host-ID. In the action 400, the OTT service providing node receives then instead a Global-host-ID which comprises the IP-address of the CG-NAT node and a layer 4 protocol and port number of the CG-NAT node which relates to an ongoing session of the host.

The action 404 differs in that it is the OTT service providing node instead performs a reverse DNS look-up of the IP-address of the CG-NAT node to the DNS server, i.e. by sending the IP-address of the CG-NAT node to the DNS server and receiving a domain name of the operator in response thereto.

The concept of the above described embodiment of determining an appropriate identifier of the OLS node will now be described in accordance with a more detailed embodiment example. This example relates to one above described embodiment, in which the host is communicatively connected via a CG-NAT.

In this embodiment:
1. The OTT service providing node sends a reverse look-up of the public IP-address of the CG-NAT to the DNS, e.g. sends "NN.NNN.NNN.NN".
2. In response to the public IP-address, the DNS responds with the domain name of the CG-NAT which is stored in the DNS, e.g. "h14n12-haes-a12.ias.bredband.example.com"
3. The OTT service providing node detects the operator of the communication network from the received domain name. In this example the OTT service providing node detects that "example" is the appropriate operator.
4. The OTT service providing node queries the DNS for the OLS node of the detected operator, e.g. by sending an SRV-record "_location._tcp_example.com".
5. In response the sent SRV-record, the DNS replies with the IP-address and tcp port number of the operator's OLS node.
6. The OTT service providing node sends a query for the geographic location of the public identifier of the host, i.e. the IP-address of the CG-NAT and the layer 4 protocol and port number of the ongoing session to the operators OLS node, e.g. "Location for IP: NN.NNN.NNN.NN TCP/UDP-port 32226".
7. The OLS node retrieves then the current geographic location information of the host, which is described below in conjunction with another embodiment, and sends then finally the requested geographic location information back to the OTT service providing node. The information could then be "Latitude: 59.402623 and Longitude: 17.948270", which is Färögatan 6 in Kista.

Figure 5:
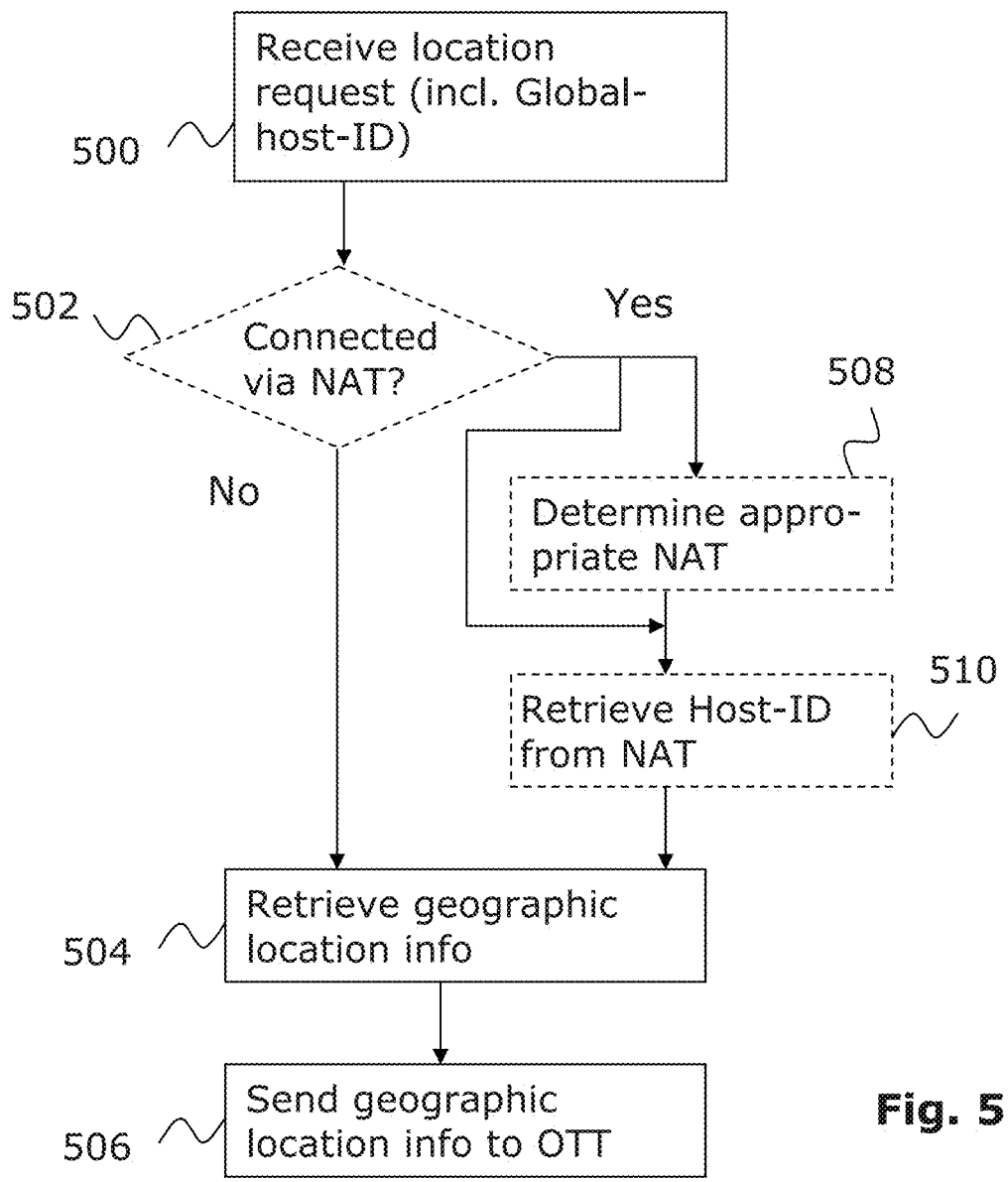
FIG. 5 is a schematic flow chart of a method, according to possible embodiments.

With reference to FIG. 5, which is a schematic flow chart, a method performed by an OLS node of retrieving geographic location information of a host will now be described in accordance with one exemplifying embodiment. The method which will be described may be performed by an OLS node of some of the above described embodiments. The OLS node is arranged by an operator of the communication network to retrieve geographic location information of hosts connected to the communication network from an appropriate LCS (Location server) node of the operator.

In a first action 500, the OLS node receives a request for a geographic location of the host from an OTT service providing node. The host is communicatively connected to the OTT service providing node via a communication network of an operator. The request comprises a Global-host-ID, which is an identifier of the host. The Global-host-ID comprises the host's IP-address and may further comprise a layer 4 protocol and port number of the ongoing session.

In a subsequent action 504, the OLS node retrieves the geographic location information of the host from an appropriate LCS (location server), where the geographic location information has been uploaded, e.g. when connecting the host to the communication network. The OLS node identifies a Host-ID from the received Global-Host-ID. The geographic location information is then retrieved by sending the Host-ID of the host to the LCS, and receiving the appropriate geographic location information in response thereto. As said above in conjunction with another embodiment, the concept is not limited to selecting one of a plurality LCSs to retrieve the geographic lactation information from. The OLS node arranged to send the IP-address to a plurality of LCSs and receive the geographic location information only from the appropriate LCS, etc.

In a final action 506, the OLS node sends the received geographic location information to the OTT service providing node, in order to be applied by the appropriate OTT service.

Thereby, the OLS node is enabled to retrieve geographic location according to an IP-address of a host upon request from an OTT service providing node.

However, as mentioned operators may have arranged a NAT node via which the connected hosts will be addressed. The Global-host-ID comprises then the IP-address of the CG-NAT node instead of the host's IP-address.

Therefore, in an alternative exemplifying embodiment which is based on the one described above, in another action 502 which is optional, the OLS node may determine whether the host is connected via a NAT node or not, for instance via a CG-NAT node. In this embodiment, the operator has stored information in the OLS node regarding which IP-addresses that belongs to NAT nodes. The OLS node determines the IP-address from the received Global-host-ID and maps the determined IP-address against the stored IP-addresses.

In a following action 510, which is performed if the OLS node finds that the host will be addressed via a NAT node, the OLS node retrieves the Host-ID by sending the determined IP-address layer 4 protocol and port number to the NAT nodes which it is connected to. The OLS node will then receive the appropriate Host-ID from the appropriate NAT node.

In addition, in another optional action 508, the OLS node may instead determine the appropriate NAT node according to the determined IP-address. Then the OLS node may send the request for Host-ID to the appropriate NAT node in action 510. By implementing functionality to determine which NAT node to retrieve the Host-ID from, requests to NAT nodes which do not have knowledge of the Host-ID could be avoided. This may result in a more effective processing, as well for the OLS node, but also for the NAT nodes that do not are connected to the host.

Figure 6:
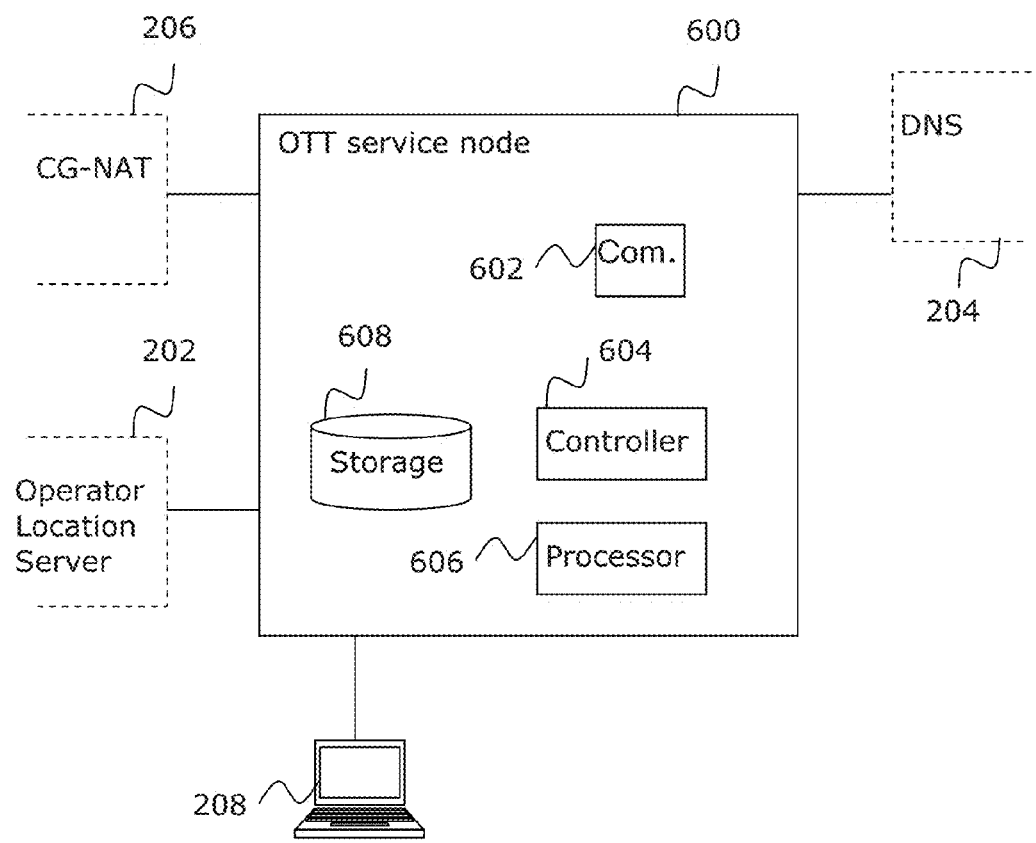
FIG. 6 is a schematic block diagram of an arrangement, according to possible embodiments.

With reference to FIG. 6, which is a schematic block diagram, an OTT service providing node 600, will now be described in accordance with one exemplifying embodiment.

The OTT service providing node 600 is adapted to provide OTT services, such as Viber calling to hosts (not shown), which are communication devices communicatively connected to an operator controlled communication network using a CG-NAT (Carrier Grade Network Address Translation) node 206. The OTT service providing node 600 is communicatively connected the communication network and reaches the communication devices via the CG-NAT node 206. As stated above in conjunction with another embodiment, the OTT service providing node 600 is not aware of the Host-ID of the host, and addresses instead the host via a Global-host-ID of the host. In this embodiment the Global-host-ID of the host is the IP-address of the CG-NAT node 206 and a layer 4 protocol and port number of the CG-NAT node 206. The layer 4 port number of the CG-NAT node 206 is temporarily assigned an ongoing OTT session of the host, e.g. a session for making an emergency call.

The OTT service providing node 600 comprises a communication module 602, a controller 604, and optionally a processor 606 and a storage module 608.

The communication module 602 is adapted to receive a request for an OTT service from the CG-NAT node 206. The request comprises the Global-host-ID. The controller 604 is adapted to determine the Global-host-ID from the received request, and determine the operator of the communication network who senses the host according to the Global-host-ID. The controller 604 is further adapted to determine an OLS node 202 of the operator. In this embodiment, the controller 604 determines the Global-host-ID from the receive request for the OTT service, and performs a reverse DNS look-up of the Global-host-ID to a DNS 204. In response thereto the controller 604 receives the name of the operator. Furthermore, the controller 604 determines the appropriate OLS node 202 by performing a DNS look-up with the DNS 204 for an SRV-record. In response the controller 604 receives the IP-address of the OLS node 202 and tcp (Transmission Control Protocol) or udp (User Datagram Protocol) port for the location service, such that it will be enabled to send a location request to the OLS node 202.

The communication module 602 is adapted to receive the registered location information of the host from the OLS node 202, after being retrieved by the OLS node 202. For instance, the geographic location information may be GPS coordinates of the host or a street address of the host. The retrieved geographic location information may then be applied by the OTT service providing node 600.

It is to be noted that the OTT service providing node 600 is not limited to perform DNS look-up for an SRV-record, the OTT service providing node 600 may be adapted to perform the DNS look-up for the address of the OLS node 202 also when it is stored in other record types, such as A-records or AAAA-records.

In an alternative exemplifying embodiment, which is related to the above described one, the communication module 602 is adapted to receive the request for OTT service directly from the communicatively connected hosts 208. In this alternative embodiment, the Global-host-ID comprises the IP-address of the host, a layer 4 protocol and a port number of the ongoing session. In other words, in this embodiment it is the IP-address of the host which is comprised in the Global-host-ID and not the IP-address of any CG-NAT node. The controller 604 is then adapted to identify the IP-address of the host, which it utilises when determining an opera tor and an identifier of the OLS node 202. Optionally, OTT service providing node may be adapted to handle both hosts which are connected directly and host that are connected via NAT-nodes.

Optionally, the OTT service providing node 600 of the above described embodiments may comprise further components or units arranged to provide appropriate functionality. For instance, suitable processors 606 or storage units 608 may by arranged to provide improved calculation capacity, storing geographic location information of hosts or address information of frequently used OLS nodes for future use.

Figure 7:
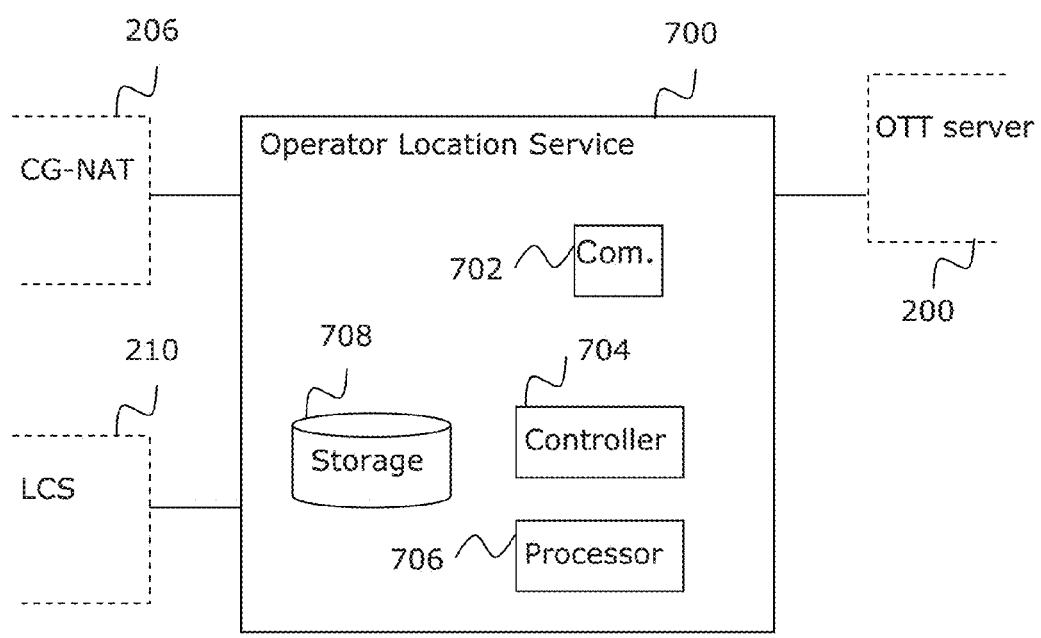
FIG. 7 is a schematic block diagram of an arrangement, according to possible embodiments.

With reference to FIG. 7, which is a schematic block diagram, an OLS node 700, will now be described in accordance with one exemplifying embodiment.

The OLS node 700 is adapted to support an OTT service providing node 200, such as an OTT server, with retrieving geographic location information for hosts which are communicatively connected to an operator controlled communication network using a CG-NAT (Carrier Grade Network Address Translation) node 206 and performs OTT services on the OTT service providing node. As stated above in conjunction with another embodiment, the OTT service providing node 600 is not aware of the Host-ID of a host connected behind the CG-NAT node 206, and addresses instead the host via a Global-host-ID of the host. In this embodiment the Global-host-ID is the IP-address of a Carrier Grade Network Address Translation (CG-NAT) node 206 and a layer 4 protocol and a port number of the CG-NAT node 206. The layer 4 port number identifies the ongoing session.

The OLS node 700 comprises a communication module 702, a controller 704, and optionally a processor 706 and a storage module 708.

The communication module 702 is adapted to receive a location request from the OTT service providing node 200 for geographic location information the host. The location request comprises the Global-host-ID, i.e. the IP-address of the CG-NAT node 206 and a layer 4 protocol and a session port number of the CG-NAT node 206. The controller 704 is adapted to retrieve the Host-ID by sending the Global-host-ID to the CG-NAT node 206, which returns the Host-ID according to a performed mapping. The controller 704 is further adapted to retrieve the requested geographic location information of the host, by sending the Host-ID to an appropriate location server 210, which stores geographic location information of communicatively connected hosts. In response thereto, the controller 704 receives the requested geographic location information and sends to the OTT service providing node 200.

The geographic location information of the hosts may be stored in different LCSs 210. In an alternative exemplifying embodiment, the controller 704 is therefore equipped with functionality to determine which LCS 210 to request. This determination may be performed according to the received Host-IDs.

Alternatively, the determination may be performed according to further information received from the CG-NAT node 206 or any other suitable communication network node when appropriate. However, the OLS node 700 may alternatively request a plurality of LCSs 210 and receive response from the appropriate LCS of the host.

Furthermore, the OLS node 700 may be further adapted to retrieve geographic location information also for hosts 208 which are not connected behind a CG-NAT node. For these hosts, the Global-host-ID of the location request comprises the Host-ID. Therefore, the controller 704 is adapted to determine the Host-ID instead of retrieving the Host-ID from a CG-NAT node.

Optionally, the OTT service providing node 700 of the above described embodiments may comprise further components or units arranged to provide appropriate functionality. For instance, suitable processors 706 or storage units 708 may by arranged to provide improved calculation capacity, or storing geographic location information of frequent hosts, etc.

Regarding some of the above described embodiments, the arrangements, nodes, and elements are schematically described and illustrated in order to simplify the understanding. However, a designer understands that the arrangements, nodes, and elements may be alternatively implemented within the disclosed concept when put into practice. For instance, any components and modules of one of the arrangements, nodes, or elements may be arranged in another arrangement, node, or element, or that further arrangements, nodes or elements may be arranged.

Figure 8:
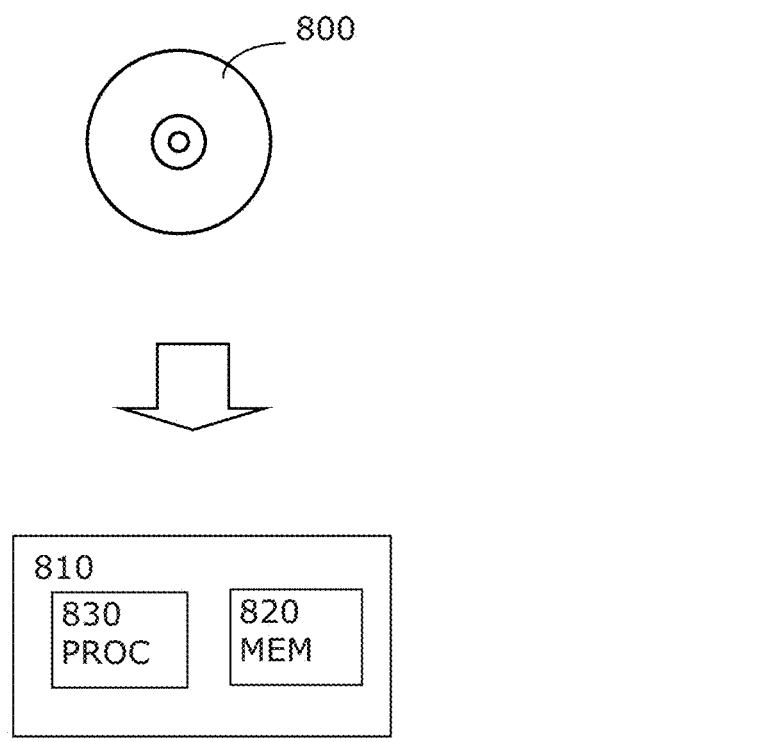
FIG. 8 is a schematic block diagram of a computer program product, according to possible embodiments.

According to some exemplifying embodiments, a computer program product comprises a computer readable medium such as, for example, a diskette or a CD-ROM (Compact Disc Read Only Memory) as illustrated by 800 in FIG. 8. The computer readable medium may have stored thereon a computer program comprising program instructions. The computer program may be loadable into a data-processing unit 830, which may, for example, be comprised in a communication network node 810. When loaded into the data-processing unit 830, the computer program may be stored in a memory 820 associated with or integral to the data-processing unit 830. According to some embodiments, the computer program may, when loaded into and run by the data-processing unit 830, cause the data-processing unit 830 to execute method steps according to, for example, the methods shown in the FIG. 4 or 5.

It is to be noted that the arrangements of the described exemplifying embodiments are described in a non-limiting manner. Typically, a designer may select to arrange further units and components to provide appropriate operation of the communication network node, within the described concept, e.g. further processors or memories. Moreover, physical implementations of the proposed arrangements may be performed alternatively within the disclosed concept. For instance, functionality of a specific illustrated unit or module may be implemented in another suitable unit or module when put into practice. The disclosed OTT service providing node and OLS node are also not limited to be implemented as specific physical nodes. A designer may select to implement corresponding OTT service functions, and OLS functions as virtual nodes in any suitable servers which are connected to the communication network, within the disclosed concept.

In addition, in the above described embodiments the Global-host-IDs comprise an IP-address, a layer 4 protocol, and a port number of an ongoing session. However, these parameters are given as examples and the disclosed concept is not limited to utilise only these parameters as identifiers. A designer may implement alternative suitable parameters as identifiers to address a specific communication network node or host, or to identify an ongoing session when appropriate. For instance, IPv4-addresses, IPv6-addresses, any markers of which type of transport protocol which is applied and the ongoing session may be applied when appropriate.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by an Over The Top (OTT) service providing node for retrieval of geographic location information of a communication device, the communication device being communicatively coupled to the OTT service providing node via a communication network, in which an Operator Location Service (OLS) node is separately employed to retrieve the geographic location information of the communication device, instead of the OTT service providing node, the method comprising:

receiving a request for an OTT service from the communication device;

determining a global identifier of the communication device;

determining an operator of the communication device by utilising the determined global identifier of the communication device to access a Domain Name Server (DNS) or an Internet Registry to obtain an identifier of the operator;

determining an identifier of the OLS node of the operator by utilising the identifier of the operator to access the DNS or the Internet Registry to obtain the identifier of the OLS node;

sending a location request to the OLS node, by using the identifier of the OLS node, for requesting geographic location information of the communication device, the location request comprising the global identifier of the communication device, wherein the global identifier of the communication device is to be utilised by the OLS node to determine a host identifier (Host-ID) of the communication device to access a location server (LCS) of the operator based on the Host-ID, instead of the OTT service providing node accessing the LCS, for retrieving the requested geographic location information from the LCS to the OLS node, and the retrieved geographic location information to be sent by the OLS node to the OTT service providing node; and receiving the sent geographic location information from the OLS node.

2. The method according to claim 1, wherein determining the operator comprises sending the determined global identifier of the communication device to the DNS and receiving a domain name of the operator in response thereto.

3. The method according to claim 1, wherein determining the identifier of the OLS node comprises sending a request for the operator's OLS node to the DNS, and receiving an Internet Protocol (IP) address of the OLS node as the identifier of the OLS node in response thereto.

4. The method according to claim 3, wherein the request for the operator's OLS node is a DNS request for a service record (SRV-record) stored in the DNS.

5. An Over The Top (OTT) service providing node for retrieval of geographic location information of a communication device, wherein the communication device is communicatively coupled to the OTT service providing node via a communication network, in which an Operator Location Service (OLS) node is separately employed to retrieve the geographic location information of the communication device, instead of the OTT service providing node, the OTT service providing node comprising:

a communication module adapted to receive a request for an OTT service from the communication device;

a controller adapted to determine a global identifier of the communication device, determine an operator of the communication device by utilising the determined global identifier of the communication device to access a Domain Name Server (DNS) or an Internet Registry to obtain an identifier of the operator, and determine an identifier of the OLS node of the operator by utilising the identifier of the operator to access the DNS or the Internet Registry to obtain the identifier of the OLS node;

the communication module further adapted to send a location request to the OLS node, by using the identifier of the OLS node, for requesting geographic location information of the communication device, the location request comprising the global identifier of the communication device, wherein the global identifier of the communication device is to be utilised by the OLS node to determine a host identifier (Host-ID) of communication device to access a location server (LCS) of the operator based on the Host-ID, instead of the OTT service providing node accessing the LCS, for retrieving the requested geographic location information from the LCS to the OLS node, and the retrieved geographic location information to be sent by the OLS node to the OTT service providing node; and the communication module further adapted to receive the sent geographic location information from the OLS node.

6. The OTT service providing node according to claim 5, wherein the controller is adapted to determine the operator by sending the determined global identifier of the communication device to the DNS and receiving a domain name of the operator in response thereto.

7. The OTT service providing node according to claim 5, wherein the controller is adapted to determine the identifier of the OLS node by sending a request for the operator's OLS node to the DNS, and receiving an Internet Protocol (IP) address of the OLS node as the identifier of the OLS node in response thereto.

8. The OTT service providing node according to claim 7, wherein the communication module is adapted to send the request for the operator's OLS node as a DNS request for a service record (SRV-record) stored in the DNS.

9. A method performed by an Operator Location Service (OLS) node for enabling an Over The Top (OTT) service providing node to retrieve geographic location information of a communication device, the communication device being communicatively coupled to the OTT service providing node via a communication network, in which the OLS node is separately employed from the OTT service providing node to retrieve the geographic location information of the communication device, instead of the OTT service providing node, the method comprising:

receiving a location request from the OTT service providing node for requesting geographic location information of the communication device, the location request comprising a global identifier of the communication device, and in which the OTT service providing node does not attempt to access a location server (LCS) of an operator of communication device to obtain the geographic location information of the communication device, but relies on the OLS node to provide functionality to retrieve the geographic location information by determining a host identifier (Host-ID) of the communication device to access the LCS based on the Host-ID;

retrieving the geographic location information of the communication device from the LCS by utilising the Host-ID of the communication device; and sending the retrieved geographic location information of the communication device to the OTT service providing node, the sent geographic location information of the communication device to be received by the OTT service providing node.

10. The method according to claim 9, wherein the global identifier of the communication device is received formatted as a Global-host-ID, wherein the Global-host-ID is an Internet Protocol (IP) address of the communication device.

11. The method according to claim 9, wherein the global identifier of the communication device is received formatted as a Global-host-ID, the method further comprises determining that the communication device is communicatively coupled to the OTT service node via a Network Address Translation (NAT) node of the communication network and utilising the received Global-host-ID of the communication device for the OLS node to retrieve the Host-ID of the communication device from the NAT node.

12. The method according to claim 11, further comprising determining which NAT node the communication device is communicatively coupled, sending the received Global-host-ID to the determined NAT node, and receiving the Host-ID in response thereto.

13. The method according to claim 11, wherein retrieving the location information of the communication device comprises sending the Host-ID of the communication device to the LCS and receiving the geographic location information of the communication device in response thereto.

14. An Operator Location Service (OLS) node for enabling an Over The Top (OTT) service providing node to retrieve geographic location information of a communication device, wherein the communication device is communicatively coupled to the OTT service providing node via a communication network, in which the OLS node is separately employed from the OTT service providing node to retrieve the geographic location information of the communication device, instead of the OTT service providing node, the OLS node comprising:
  a communication module adapted to receive a location request from the OTT service providing node for requesting geographic location information of the communication device, the location request comprising a global identifier of the communication device, and in which the OTT service providing node does not attempt to access a location server (LCS) of an operator of the communication device to obtain the geographic location information of the communication device, but relies on the OLS node to provide functionality to retrieve the geographic location information to determine a host identifier (Host-ID) of the communication device to access the LCS based on the Host-ID;
  a controller adapted to retrieve the geographic location information of the communication device from the LCS by utilising the Host-ID of the communication device; and
  the communication module further adapted to send the retrieved geographic location information of the communication device to the OTT service providing node, wherein the sent geographic location information of the communication device is to be received by the OTT service providing node.

15. The OLS node according to claim 14, wherein the communication module is adapted to receive the global identifier of the communication device formatted as a Global-host-ID, wherein the Global-host-ID is an Internet Protocol (IP) address and session port number of the communication device.

16. The OLS node according to claim 15, wherein the controller is adapted to retrieve the location information of the communication device by sending the Host-ID of the communication device to the LCS and receiving the geographic location information of the communication device in response thereto.

17. The OLS node according to claim 14, wherein the communication module is adapted to receive the global identifier of the communication device formatted as a Global-host-ID, wherein the controller is adapted to determine that the communication device is communicatively coupled to the OTT service node via a Network Address Translation (NAT) node of the communication network and utilise the received Global-host-ID of the communication device to retrieve the Host-ID of the communication device from the NAT node.

18. The OLS node according to claim 17, wherein the controller is adapted to determine which NAT node the communication device is communicatively coupled, send the received Global-host-ID to the determined NAT node, and retrieve the Host-ID in response thereto.

19. The OLS node according to claim 18, wherein the controller is adapted to determine both an Internet Protocol (IP) address of the NAT node and a session port number of the NAT node from the Global-host-ID.

20. A non-transitory computer-readable storage medium having computer code stored therein, which when executed by a processor of an Over The Top (OTT) service providing node for retrieval of geographic location information of a communication device, the communication device being communicatively coupled to the OTT service providing node via a communication network, in which an Operator Location Service (OLS) node is separately employed to retrieve the geographic location information of the communication device, instead of the OTT service providing node, causes the OTT service providing node to perform operations comprising:
  receiving a request for an OTT service from the communication device;
  determining a global identifier of the communication device;
  determining an operator of the communication device by utilising the determined global identifier of the communication device to access a Domain Name Server (DNS) or an Internet Registry to obtain an identifier of the operator;
  determining an identifier of the OLS node of the operator by utilising the identifier of the operator to access the DNS or the Internet Registry to obtain the identifier of the OLS node;
  sending a location request to the OLS node, by using the identifier of the OLS node, for requesting geographic location information of the communication device, the location request comprising the global identifier of the communication device, wherein the global identifier of the communication device is to be utilised by the OLS node to determine a host identifier (Host-ID) of the communication device to access a location server (LCS) of the operator based on the Host-ID, instead of the OTT service providing node accessing the LCS, for retrieving the requested geographic location information from the OLS node, and the retrieved geographic location information to be sent by the OLS node to the OTT service providing node; and
  receiving the sent geographic location information from the OLS node.

* * * * *